United States Patent [19]

Onogi et al.

[11] Patent Number: 4,807,941
[45] Date of Patent: Feb. 28, 1989

[54] ANTI-SKID CONTROL SYSTEM

[75] Inventors: Nobuyoshi Onogi; Mamoru Shimamoto, both of Nagoya; Yosiaki Hoashi, Kariya; Masakazu Tago, Aichi, all of Japan

[73] Assignee: Nippondenso Co., Ltd., Kariya, Japan

[21] Appl. No.: 62,779

[22] Filed: Jun. 15, 1987

[30] Foreign Application Priority Data

Jun. 19, 1986 [JP] Japan .................. 61-143844

[51] Int. Cl.$^4$ .................. B60T 8/08; B60T 8/10
[52] U.S. Cl. .................. 303/108; 303/109; 188/181 C
[58] Field of Search .......... 303/108, 107, 10; 188/181 C; 361/238

[56] References Cited

U.S. PATENT DOCUMENTS

| 3,637,264 | 1/1972 | Leiber et al. | 188/181 A |
| 3,762,775 | 10/1973 | Ochiai | 188/181 C |
| 3,848,933 | 11/1974 | Ochiai | 303/109 |
| 3,871,715 | 3/1975 | Hikada et al. | 303/109 |
| 4,384,330 | 5/1983 | Matsuda et al. | 303/119 Y |
| 4,666,218 | 5/1987 | Masaki et al. | 303/109 Y |

FOREIGN PATENT DOCUMENTS

| 51-6308 | 2/1976 | Japan . | |
| 0136038 | 10/1979 | Japan | 303/108 |
| 0053944 | 5/1981 | Japan | 303/109 |
| 59-30585 | 7/1984 | Japan . | |

Primary Examiner—Andres Kashnikow
Assistant Examiner—Matthew C. Graham
Attorney, Agent, or Firm—Cushman, Darby & Cushman

[57] ABSTRACT

Rotational speed of a vehicle wheel is detected. An actuator serves to brake the vehicle wheel. A braking condition of the actuator is derived. Speed of a vehicle is derived from the detected vehicle wheel speed and the derived braking condition of the actuator. The actuator is controlled in accordance with the detected vehicle wheel speed and the derived vehicle speed.

4 Claims, 10 Drawing Sheets

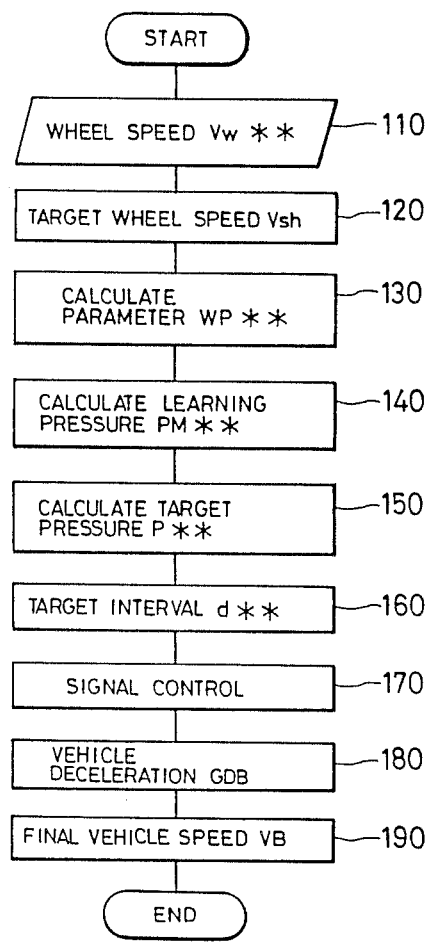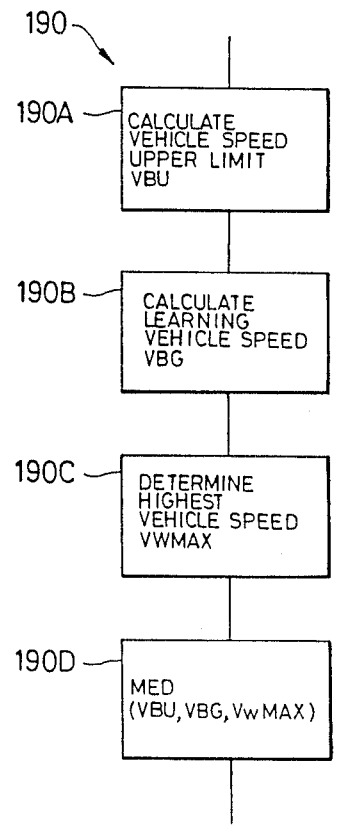

ANTI-SKID CONTROL SYSTEM

BACKGROUND OF THE INVENTION

1. Field of the Invention

This invention relates to an anti-skid control system for a vehicle, such as an automotive vehicle. This invention also relates to a vehicle speed deducing system usable in a vehicle control system, such as a vehicle anti-skid control system.

2. Description of the Prior Art

In some known vehicle anti-skid control systems, vehicle wheel rotational speed is detected by a sensor and also pseudo vehicle speed is determined by processing the output signal from the vehicle wheel speed sensor. During application of a vehicle brake, the pseudo vehicle speed is compared with the vehicle wheel speed to determine vehicle wheel slip ratio. Brake force applied to vehicle wheels by the brake is adjusted in accordance with the determined slip ratio so that unacceptable degree of vehicle wheel slippage can be prevented and the vehicle can be optimally braked. Japanese published examined patent application No. 59-30585 discloses such a vehicle anti-skid control system.

In other known vehicle anti-skid control systems, vehicle speed used in controlling brake force is deduced from the highest of vehicle wheel rotational speeds detected by a plurality of sensors associated with respective vehicle wheels or deduced from given deceleration. When the vehicle wheels are locked, or when all of the vehicle wheels undergo essentially the same slip ratio, the deduced vehicle speed tends to be lower than the actual vehicle speed. Such a deviation of the deduced vehicle speed from the actual vehicle speed lowers the accuracy or reliability of the anti-skid control.

SUMMARY OF THE INVENTION

It is an object of this invention to provide an accurate and reliable anti-skid control system.

It is another object of this invention to provide an accurate vehicle speed deducing system.

In an anti-skid control system according to a first aspect of this invention, rotational speed of a vehicle wheel is detected. An actuator serves to brake the vehicle wheel. A braking condition of the actuator is derived. Deceleration of a vehicle is derived from the derived braking condition. The detected vehicle wheel speed is corrected in accordance with the derived vehicle deceleration so that speed of the vehicle is derived. The actuator is controlled in accordance with the detected vehicle wheel speed and the derived vehicle speed.

In an anti-skid control system according to a second aspect of this invention, rotational speed of a vehicle wheel is detected. A hydraulic actuator serves to brake the vehicle wheel. A device derives hydraulic brake pressure applied to the hydraulic actuator which corresponds to a friction coefficient of road surface. First speed of a vehicle is derived from the detected vehicle wheel speed. Second speed of the vehicle is derived from the detected hydraulic brake pressure. Final speed of the vehicle is derived in accordance with the first vehicle speed and the second vehicle speed. The hydraulic brake pressure applied to the hydraulic actuator is controlled in accordance with the detected vehicle wheel speed and the final vehicle speed.

In a system according to a third aspect of this invention, rotational speed of a vehicle wheel is detected. A device derives a condition of a vehicle brake relating to brake force applied to the vehicle wheel. Speed of the vehicle is deduced from the detected vehicle wheel speed and the derived brake condition.

BRIEF DESCRIPTION OF THE DRAWINGS

FIG. 7 is a flowchart of a program operating the electronic control circuit in FIGS. 3 and 5.

FIG. 8 is a diagram of an internal design of the vehicle speed calculation block in FIG. 7.

Like and corresponding elements are denoted by the same reference characters throughout the drawings.

DESCRIPTION OF THE BASIC PREFERRED EMBODIMENT

Figure 1:
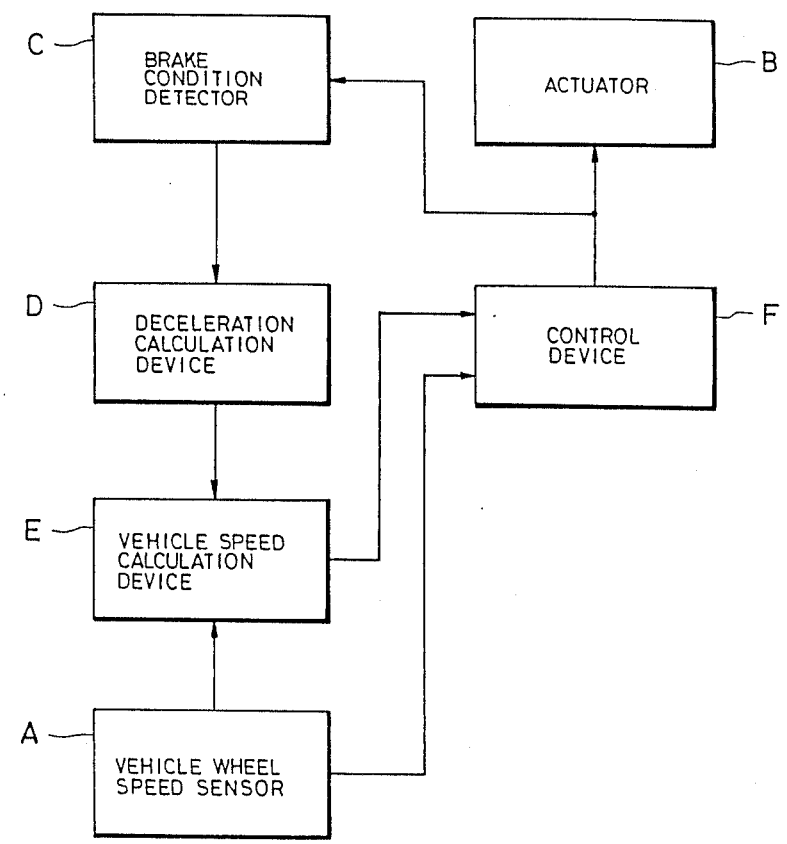
FIG. 1 is a block diagram of an anti-skid control system according to a basic embodiment of this invention.

With reference to FIG. 1, a vehicle anti-skid control system includes a vehicle wheel speed sensor A and a vehicle brake control actuator B. The sensor A detects rotational speed of a vehicle wheel. When the actuator B is activated, a vehicle is braked. A detector or device C senses or derives a condition of the actuator B related to a brake force applied to the vehicle. A device D deduces or calculates deceleration of the vehicle from the brake condition derived through the detector C. A device E deduces or calculates vehicle speed by correcting the detected vehicle wheel speed in accordance with the calculated vehicle deceleration. A device F controls the actuator B in accordance with the detected vehicle wheel speed and the calculated vehicle speed.

For example, the actuator B includes a hydraulic brake wheel cylinder. The brake force condition detector C includes a sensor detecting hydraulic pressure applied to the brake wheel cylinder. In place of the pressure sensor, the brake force condition detector C may include an arrangement detecting or deriving a brake condition from a control signal outputted by the control device F to the actuator B.

During vehicle anti-skid control, the vehicle wheel rotational speed and the brake force condition are detected by the sensor A and the detector C. In the device D, the vehicle deceleration is deduced or calculated from the brake force condition derived through the detector C. In the device E, the vehicle speed is deduced or calculated in accordance with the calculated vehicle deceleration and the detected vehicle wheel speed. The device F controls the actuator B in accordance with the calculated vehicle speed and the detected vehicle wheel speed so that vehicle wheel slip ratio can be maintained at an optimal value.

Figure 2A:
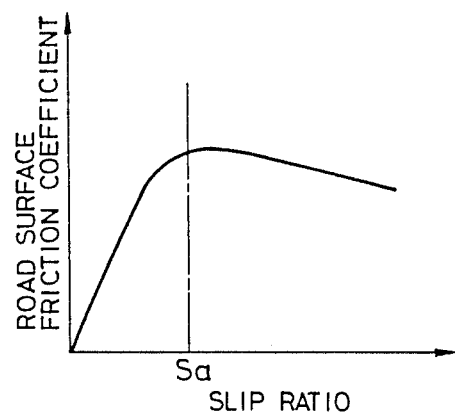
FIG. 2(a) is a graph of the relationship between slip ratio and road surface friction coefficent.

The calculation of the vehicle speed will be described in more detail hereinafter. As shown in FIG. 2(a), during the application of the brake to the vehicle, the coefficient of friction between the vehicle wheel and a road surface varies as a function of the vehicle wheel slip ratio.

Figure 2B:
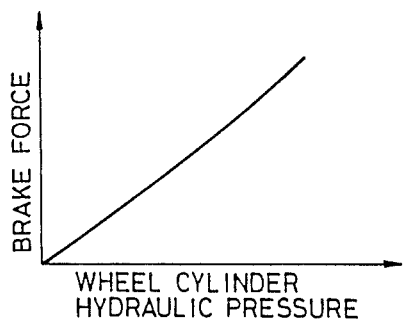
FIG. 2(b) is a graph of the relationship between wheel cylinder hydraulic pressure and brake force.

Specifically, in the range of the slip ratio below a given value Sa, the friction coefficent increases with the slip ratio and is essentially proportional to the slip ratio. The slip ratio range below the given value Sa corresponds to a stable range where the vehicle wheel remains unlocked. In the stable range, as shown in FIG. 2(b), the brake force is essentially proportional to the hydraulic pressure applied to the hydraulic brake wheel cylinder. Accordingly, in the stable range, the brake force and the vehicle deceleration are accurately deduced from the hydraulic brake pressure. The vehicle speed is precisely estimated or calculated in accordance with the accurately deduced vehicle deceleration.

In the range of the slip ratio equal to or above the given value Sa, the friction coefficient decreases with the slip ratio. The slip ratio range equal to or above the given value Sa corresponds to an unstable range where the vehicle wheel is locked. In the unstable range, the brake force and the vehicle speed are estimated or calculated from the hydraulic pressure in a learning technique or method.

DESCRIPTION OF THE SPECIFIC PREFERRED EMBODIMENTS

Figure 3:
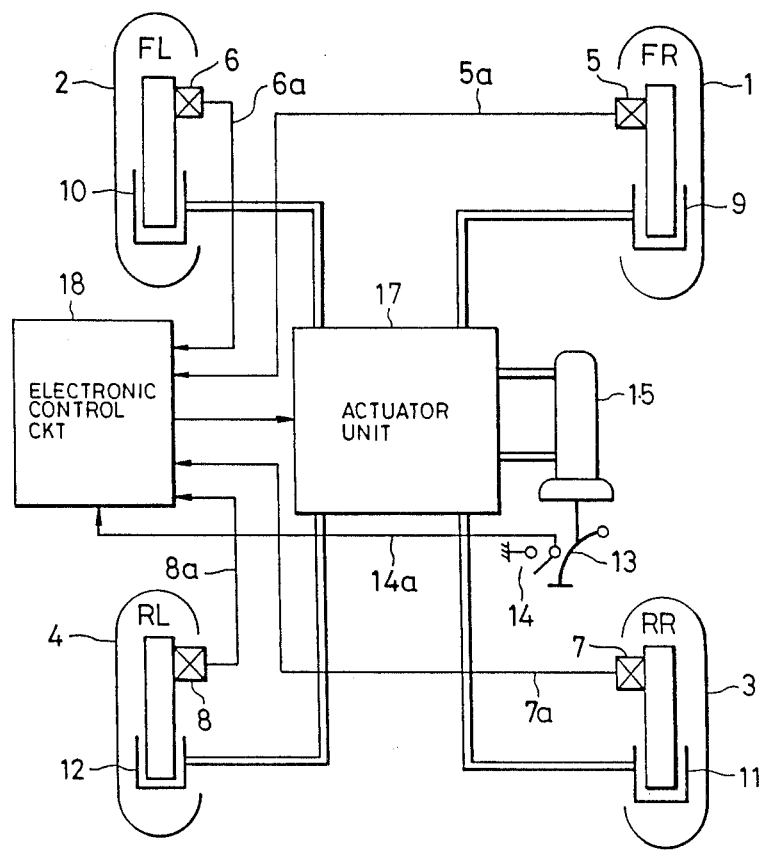
FIG. 3 is a diagram of an anti-skid control system according to a first specific embodiment of this invention.
Figure 4:
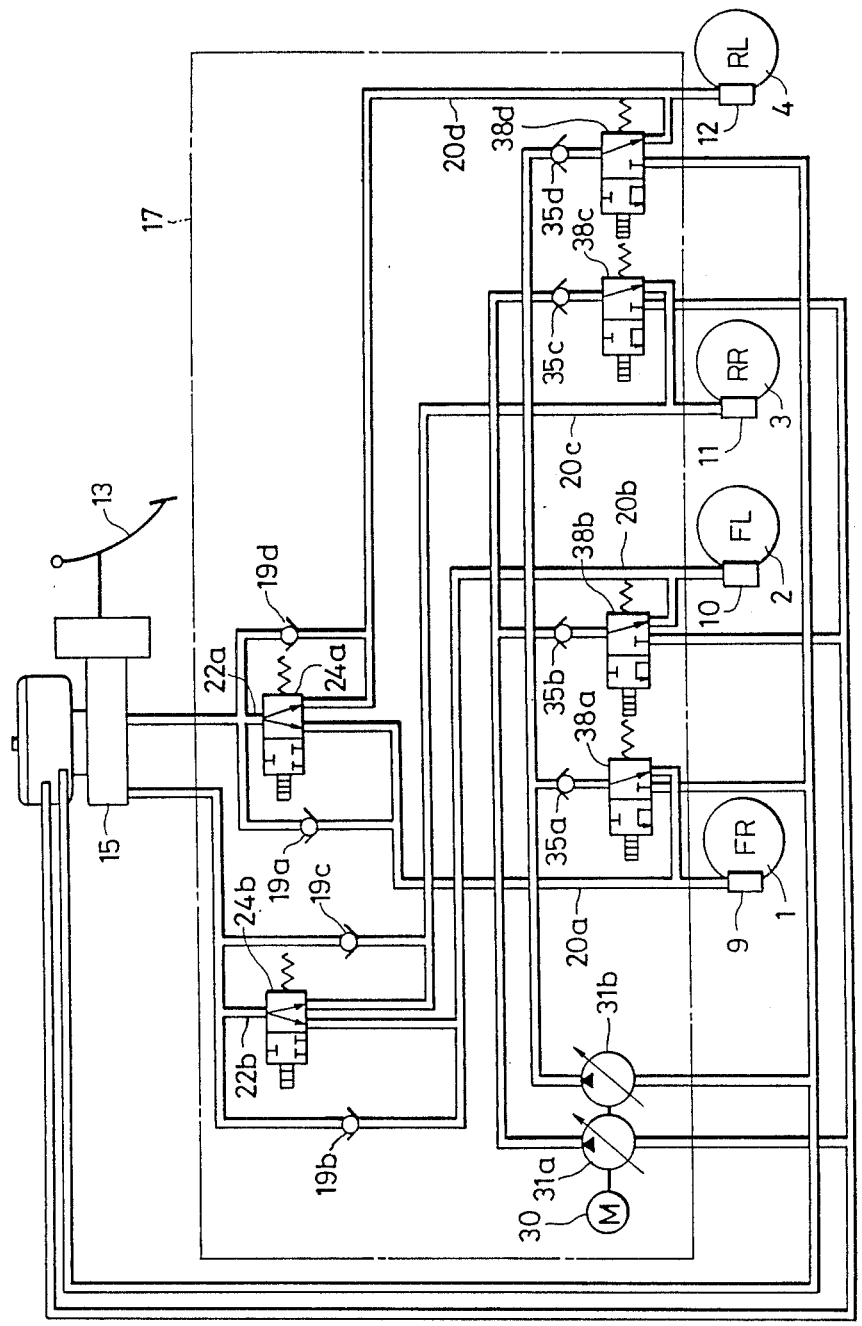
FIG. 4 is a diagram of a hydraulic circuit in the system of FIG. 3.
Figure 5:
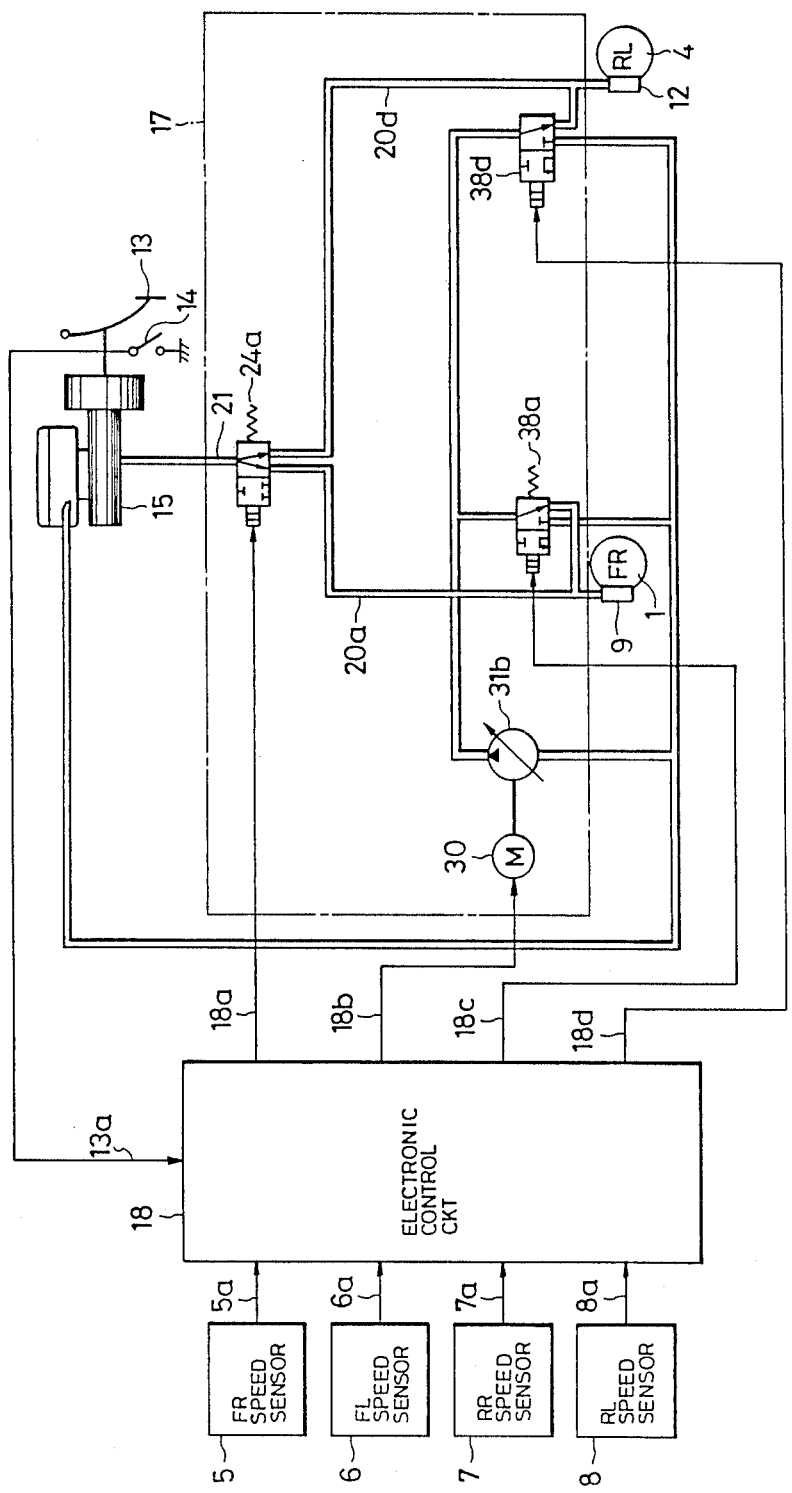
FIG. 5 is a diagram of a portion of the system in FIG. 3.

With reference of FIGS. 3-5 showing a vehicle anti-skid control system according to a first specific embodiment of this invention, a vehicle includes a front right-hand wheel (FR) 1, a front left-hand wheel (FL) 2, a rear right-hand wheel (RR) 3, and a rear left-hand wheel (RL) 4. The front vehicle wheels 1 and 2 are connected to a vehicular engine so that the front wheels 1 and 2 serve as driving wheels. The rear vehicle wheels 3 and 4 generally serve as idler wheels.

Rotational speed sensors 5-8 associated with the vehicle wheels 1-4 generate signals 5a-8a representing rotational speeds of the vehicle wheels 1-4 respectively. For example, the vehicle wheel speed sensors 5-8 are of the electromagnetic pick-up type or the photoelectric type.

Wheel cylinders 9-12 included in a hydraulic brake are associated with the vehicle wheels 1-4 respectively. The vehicle includes a brake pedal 13. A stop switch or position sensor 14 connected to the brake pedal 13 generates a signal 14a representing whether or not the brake pedal 13 is depressed, that is, whether or not the brake is activated. A master cylinder 15 connected to the brake pedal 13 generates a hydraulic brake pressure when the brake pedal 13 is depressed. The master cylinder 15 is hydraulically connected to the wheel cylinders 9-12 so that the hydraulic brake pressure can be applied to the wheel cylinders 9-12. A pressure control device or actuator unit 17 disposed in the connection of the master cylinder 15 to the wheel cylinders 9-12 adjustably determines hydraulic brake pressures applied to the respective wheel cylinders 9-12. An electronic control circuit 18 connected to the actuator unit 17 outputs pressure control signals to the actuator unit 17. The hydraulic brake pressures applied to the wheel cylinders 9-12 are adjusted in accordance with the pressure control signals.

As shown in FIG. 4, the actuator unit 17 includes check valves 19a-19d disposed in respective hydraulic lines 20a-20d which connect the wheel cylinders 9-12 to the master cylinder 15 respectively. A two-position solenoid valve 24a is connected in parallel to the check valves 19a and 19d via a hydraulic line 22a. Another two-position solenoid valve 24b is connected in parallel to the check valves 19b and 19c via a hydraulic line 22b.

The actuator unit 17 includes a motor 30 and hydraulic pumps 31a and 31b. The hydraulic pumps 31a and hydraulic pumps 31a and 31b. The hydraulic pumps 31a and 31b are mechnically connected to the motor 30 so that they can be driven by the motor 30. A high pressure side or outlet of the hydraulic pump 31a is hydraulically connected to the wheel cylinder 10 via a check valve 35b and a two position solenoid valve 38b so that a hydraulic pressure developed by the pump 31a can travel to the wheel cylinder 10 via the elements 35b and 38b. The outlet of the hydraulic pump 31a is also hydraulically connected to the wheel cylinder 11 via a check valve 35c and a two position solenoid valve 38c so that a hydraulic pressure developed by the pump 31a can travel to the wheel cylinder 11 via the elements 35c and 38c. A high pressure side or outlet of the hydraulic pump 31b is hydraulically connected to the wheel cylinder 9 via a check valve 35a and a two position solenoid valve 38a so that a hydraulic pressure developed by the pump 31b can travel to the wheel cylinder 9 via the elements 35a and 38a. The outlet of the hydraulic pump 31b is also hydraulically connected to the wheel cylinder 12 via a check valve 35d and a two position solenoid valve 38d so that a hydraulic pressure developed by the pump 31b can travel to the wheel cylinder 12 via the elements 35d and 38d. The solenoid valves 38b and 38c are hydraulically connected to a low pressure side or inlet of the hydraulic pump 31a. The solenoid valves 38a and 38d are hydraulically connected to a low pressure side or inlet of the hydraulic pump 31b.

As shown in FIG. 5, the electronic control circuit 18 is electrically connected to the solenoid valves 24a, 38a, and 38d, and the motor 30 within the actuator unit 117. The electronic control circuit 18 outputs control signals 18a, 18b, 18c, and 18d to the elements 24a, 30, 38a, and 38d respectively.

When the brake pedal 13 is depressed, the master cylinder 15 develops an increasing hydraulic brake pressure. During a period prior to anti-skid control, the control signals 18a-18d outputted from the electronic control circuit 18 to the elements 24a, 30, 38a, and 38d are in logic "0" states so that the solenoid valves 24a, 38a, and 38d are in positions as shown in FIG. 5 and that the motor 30 is at rest. Accordingly, in cases where the brake pedal 13 is depressed, during the period prior to anti-skid control, the hydraulic brake pressure developed by the master cylinder 15 is applied through the solenoid valve 24a to the wheel cylinders 9 and 12, exerting brake forces on the vehicle wheels 1 and 4 in accordance with the hydraulic brake pressure. During this period, the check valves 35a and 35d (see FIG. 4) prevent the transmission of the hydraulic brake pressure from the wheel cylinders 9 and 10 to the hydraulic pump 31b.

In cases where the brake pedal 13 is depressed, when the electronic control circuit 18 starts anti-skid control in accordance with the vehicle wheel speed signals 5a–8a from the sensors 5–8, the control signals 18a and 18b outputted from the electronic control circuit 18 to the solenoid valve 24a and the motor 30 assume logic "1" states so that the positions of the solenoid valve 24a changes and the motor 30 is activated. This position change of the solenoid valve 24a disconnects the wheel cylinders 9 and 12 from the master cylinder 15. The activation of the motor 30 powers the hydraulic pump 31b so that the hydraulic pump 31b generates a hydraulic pressure which can travel to the wheel cylinders 9 and 12 via the check valves 35a and 35d (see FIG. 4) and via the solenoid valves 38a and 38d.

During anti-skid control, the control signals 18c and 18d outputted from the electronic control circuit 18 to the solenoid valves 38a and 38d are periodically moved between logic "0" states and logic "1" states at a fixed frequency. In other words, during anti-skid control, the solenoid valves 38a and 38d are subjected to constant frequency pulse drive. The positions of the solenoid valves 38a and 38d change in accordance with movement of the control signals 18c and 18d between logic "0" states and logic "1" states. During anti-skid control, when the control signals 18c and 18d assume logic "1" states, the solenoid valves 38a and 38d disconnect the wheel cylinders 9 and 12 from the high pressure side of the hydraulic pump 31b but connect the wheel cylinders 9 and 12 to the low pressure side of the hydraulic pump 31b so that the brake pressures applied to the wheel cylinders 9 and 12 drop. When the control signals 18c and 18d assume logic "0" states, the solenoid valves 38a and 38d disconnect the wheel cylinders 9 and 12 from the low pressure side of the hydraulic pump 31b but connect the wheel cylinders 9 and 12 to the high pressure side of the hydraulic pump 31b so that the brake pressures applied to the wheel cylinders 9 and 12 rise. Accordingly, average or effective values of the brake pressures applied to the wheel cylinders 9 and 12 depend on the duty cycles of the control signals 18c and 18d respectively. During anti-skid control, the electronic control circuit 18 controls the wheel cylinder brake pressures through adjustments of the duty cycles of the control signals 18c and 18d.

The electronic control circuit 18 is electrically connected to the solenoid valves 24b, 38b, and 38c within the actuator unit 17. It should be noted that the solenoid valves 24b, 38b, and 38c are omitted from FIG. 5 and also the connections of the electronic control circuit 18 to the solenoid valves 24b, 38b, and 38c are omitted from FIG. 5. The electronic control circuit 18 outputs control signals to the solenoid valves 24b, 38b, and 38c respectively. The electronic control circuit 18 controls the solenoid valves 24b, 38b, and 38c in a manner similar to the control of the solenoid valves 24a, 38a, and 38d. The hydraulic pump 31a is activated and deactivated in accordance with the control signal 18b to the motor 30 in a manner similar to the activation and deactivation of the hydraulic pump 31b. Accordingly, in cases where the brake pedal 13 is depressed, during a period prior to anti-skid control, a hydraulic brake pressure is applied from the master cylinder 15 to the wheel cylinders 10 and 11. During anti-skid control, the wheel cylinders 10 and 11 are subjected to brake pressures derived from a hydraulic pressure developed by the hydraulic pump 31a. During anti-skid control, the electronic control circuit 18 controls the wheel cylinder brake pressures through adjustments of duty cycles of the control signals outputted to the solenoid valves 38b and 38c.

Figure 6:
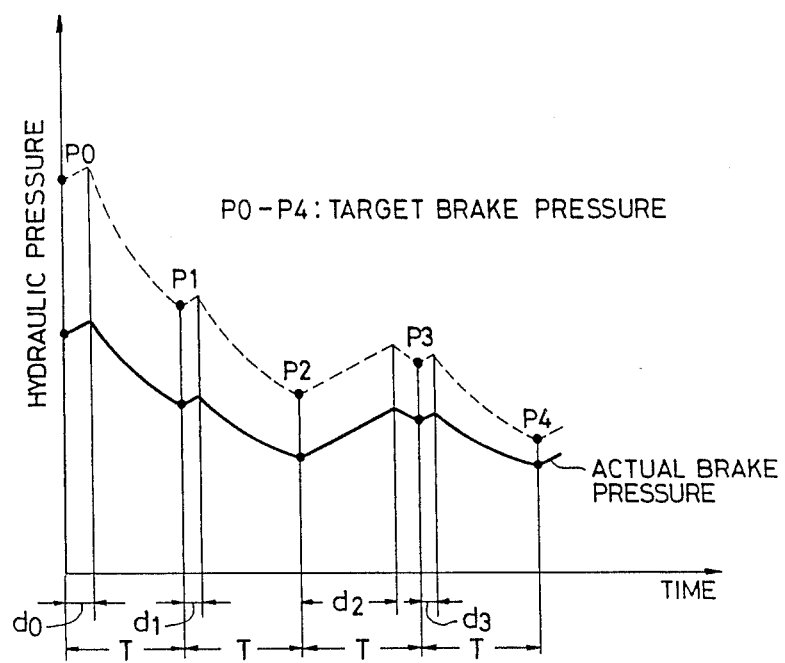
FIG. 6 is a diagram showing time dependent variations in actual hydraulic pressure and target hydraulic pressure determined in the system of FIGS. 3–5.

The control of the hydraulic brake pressures through adjustments of the duty cycles of the control signals applied to the solenoid valves 38a–38d will be described in more detail hereinafter. In FIG. 6, the solid line denotes an actual brake pressure applied to the wheel cylinder 9, 10, 11, or 12 while the dots P0–P4 denote target brake pressures determined in the electronic control circuit 18. The control signal applied to the solenoid valve 38a, 38b, 8c, or 38d alternates between a logic "0" state and a logic "1" state at a fixed period T, for example, a period of 32 msec. In FIG. 6, during first portions d0–d3 of respective fixed intervals T, the control signal applied to the solenoid valve is in a logic "0" state so that the actual brake pressure rises. The rate of the rise of the actual brake pressure depends on characteristics of the hydraulic pump 31a or 31b and is approximately constant. During the remaining portions of the respective fixed intervals T, the control signal applied to the solenoid valve is in a logic "1" state so that the actual brake pressure drops. The rate of the drop of the actual brake pressure depends on structures of hydraulic fluid flow restrictions and on the viscosity of hydraulic fluid and are generally exponential. As the first portions d0–d3 of the respective fixed intervals T are extended and shortened by the duty cycle control, the average or effective hydraulic brake pressure rises and drops respectively.

As shown in FIG. 6, the target brake pressure (P0–P4) is periodically determined at regularly separated moments. In FIG. 6, the broken line connecting the target brake pressures P0–P4 represents an assumed target brake pressure which rises and drops at rates chosen on the basis of the experimentally detected rising and dropping rates of the actual brake pressure. Specifically, the rising rate of the assumed target brake pressure is constant in correspondence with the rising rate of the actual brake pressure. The dropping rate of the assumed target brake pressure is exponential in correspondence with the dropping rate of the actual brake pressure. These constant rising rates and exponetial dropping rates of the assumed target brake pressure and the actual brake pressure generally ensure that the target brake pressure quickly approaches the actual brake pressure even when the target brake pressure was initially set considerably different from the actual brake pressure. Accordingly, the target brake pressure substantially corresponds to the actual brake pressure.

The electronic control circuit 18 includes a microcomputer system having a combination of a central processing unit, a read-only memory, a random-access memory, and an input/output circuit. The electronic control circuit 18 operates in accordance with a program stored in the read-only memory. FIG. 7 is a flowchart of a portion of the program relating to anti-skid control. The anti-skid control program reiterates at a fixed period. During an application of the brake to the vehicle, in the first execution cycle of the anti-skid control program, an initialization step preceding a step 110 (which will be described hereinafter) generally set the variables to preset initial values. In the subsequent execution cycles of the anti-skid control program, the initialization step remains unexecuted. In the following description of the anti-skid control program, the adscript n represents that the value of the related variable was determined in the present execution cycle of the program while the adscript n−1 represents that the value of the related variable was determined in the execution cycle of the program preceding the present execution cycle of the program. In addition, the character ** identifies the vehicle wheels and represents either of the letters FL, FR, RL, and RR corresponding to the front left-hand wheel, the front right-hand wheel, the rear left-hand wheel, and the rear right-hand wheel respectively.

It should be noted that the electronic control circuit 18 starts anti-skid control in accordance with the vehicle wheel speed signals $5a$–$8a$ from the sensors 5–8 and with the brake pedal signal $14a$ from the sensor 14 in a known way.

As shown in FIG. 7, a first step 110 of the anti-skid control program reads or derives the current vehicle wheel speeds VW** from the signals $5a$–$8a$ outputted by the vehicle wheel speed sensors 5–8.

A step 120 subsequent to the step 110 calculates a target vehicle wheel speed Vsh by referring to the following equation.

$$S = (VB - Vsh)/VB$$

where the letter S represents a preset slip ratio, and the character VB represents a final vehicle speed which will be described hereinafter. In the case where the preset slip ratio S equals 0.2, the target vehicle wheel speed Vsh is calculated via the following equation: $Vsh = VB - 0.2VB$. The step 120 uses the final vehicle speed VB which was derived in the execution cycle of the program preceding the present execution cycle of the program. Accordingly, the final vehicle speed $VBn-1$ is used in the step 120.

A step 130 subsequent to the step 120 calculates the parameters WP relating to the differences between the actual vehicle wheel speeds VW and the target vehicle wheel speed Vsh. The parameters WP** are determined by referring to the following equation.

$$WPn = K6(VW - Vsh) + K8(GW**n-1 - GDBn-1)$$

where the characters K6 and K8 denote preset constants, and the characters $GW**n-1$ and $GDBn-1$ represent the decelerations of the vehicle wheel speeds and the deceleration of the vehicle speed respectively.

A step 140 subsequent to the step 130 calculates learning hydraulic pressures PM from the parameters WPn by referring to the following equation.

$$PMn = PMn-1 + K9(WP**n)$$

K9 denotes a preset constant. In a stable range where the vehicle wheels remain unlocked, the learning hydraulic pressures PM** correspond to the coefficients of friction between the road surface and the vehicle wheels and essentially agree with the actual hydraulic pressures applied to the wheel cylinders. In an unstable range where the vehicle wheels are locked, control is performed such that the actual wheel cylinder hydraulic pressures are decreased quickly so as to release the vehicle wheels from their locked condition. At this time, since the learning hydraulic pressures vary as a function of the preceding learning values as described previously, they vary gradually in a manner different from the variations in the actual wheel cylinder pressures. Therefore, the learning hydraulic pressures vary in a manner similar to the manner in which the actual hydraulic pressure variations are smoothed.

A step 150 subsequent to the step 140 calculates target hydraulic pressures Pn from the learning hydraulic pressures PMn and the parameters WP**n by referring to the following equation.

$$Pn = PMn + K10(WP**n)$$

where the character K10 denotes a preset constant.

A step 160 subsequent to the step 150 calculates target intervals d during which the control signals outputted to the solenoid valves $38a$–$38d$ should be held in logic "0" states to increase the actual hydraulic pressures applied to the wheel cylinders. The target intervals d are determined as portions of the fixed period T which equals the inverse value of the fixed frequency of pulses in the control signals outputted to the solenoid valves $38a$–$38d$. Specifically, the target intervals d are calculated from the target hydraulic pressures Pn and P**n−1 by referring to the following equation.

$$d = (Pn - 0.5Pn-1)T/(0.5Pn-1 + K7)$$

where the character K7 denotes a preset constant preferably equal to 11. This equation is determined as follows. In cases where the solenoid valves $38a$–$38d$ are controlled in accordance with signals corresponding to the target intervals d, the hydraulic pressures Pn developed at a moment a given interval T after the occurrence of the present hydraulic pressures P**n−1 are estimated or calculated by the following equation.

$$Pn = (Pn-1 + 0.11d/T)\text{EXP}[-0.69 \times 10^{-3}(100 - d/T)]$$

where the constants are chosen in view of characteristics of the system of the solenoid valve hydraulic pressure lines or pipes. The equation defining the target intervals d is approximately derived by rewriting the equation defining the hydraulic pressures Pn.

A step 170 subsequent to the step 160 adjust the control pulse signals applied to the solenoid valves $38a$–$38d$ in accordance with the target intervals d. Specifically, the actual intervals during which these control pulse signals remain in logic "0" states are made equal to the target intervals d. Thus, the duty cycles of these control pulse signals are made equal to the values d**/T.

A step 180 subsequent to the step 170 deduces or estimates the vehicle deceleration GDBn from the learning hydraulic pressures PM**n by referring to the following equation.

$$GDBn = K11(PMFRn + PMFLn) + K12(PMRRn + PMRLn) + K13$$

where the characters K11, K12, and K13 denote preset constants relating to the front vehicle wheels, the rear vehicle wheels, and the coeffcent of rolling friction between the road surface and the vehicle wheels respectively. The front wheel constant K11 is preferably about twice the rear wheel constant k12 in the case of a front wheel steering and front wheel drive (IF) vehicle. The rolling constant K13 corresponds to a brake force which is applied to each of the vehicle wheels from the road surface when the hydraulic brake pressures applied to the wheel cylinders are absent.

A block 190 subsequent to the step 180 deduces or estimates the final vehicle speed VB. After the block 190, the present excecution cycle of the anti-skid control program ends.

As shown in FIG. 8, the block 190 includes steps 190A-190D. The step 190A following the step 180 calculates an vehicle speed upper limit VBU which equals the preceding final vehicle speed VBn−1 plus a preset constant Kup. The step 190B following the step 190A calculates a learning vehicle speed VBG which equals the preceding final vehicle speed VBn−1 minus the vehicle deceleration GDBn. The step 190C following the step 190B calculates or determines a value VWMAX which equals the highest of the vehicle wheel speeds VWFL, VWFR, VWRL, and VWRR. The step 190D following the step 190C calculates or determines the final vehicle speed VBn which equals the intermediate of the three values VBU, VBG, and VWMAX. Specifically, the step 190D compares the three values VBU, VBG, and VWMAX and selects one of the three values which is intermediate between the other two values. The selected value is used as the final vehicle speed VBn. After the step 190D, the present excecution cycle of the anti-skid control program ends.

Operation of the anti-skid control system of FIGS. 3-8 will be described in more specifically hereinafter with reference to FIGS. 9 and 10.

Figure 9:
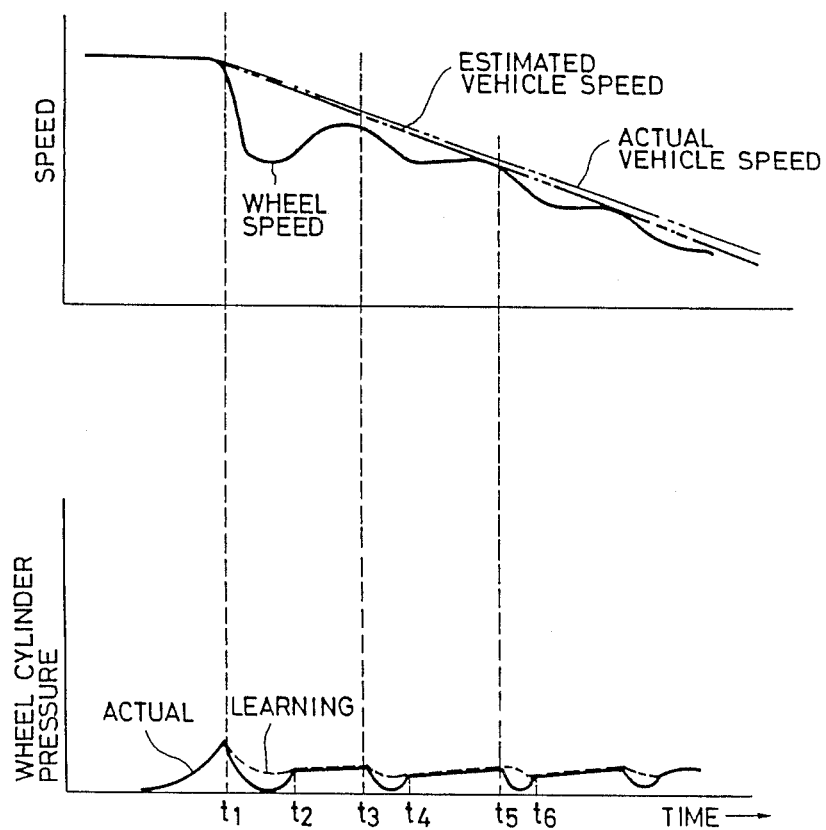
FIG. 9 is a diagram showing time dependent variations in vehicle wheel speed, deduced vehicle speed, actual vehicle speed, wheel cylinder hydraulic pressure, and learning hydraulic pressure in the system of FIGS. 3–8.

In the upper gaph of FIG. 9, the solid line denotes the vehicle wheel speed while the broken lines denote the estimated or deduced final vehicle speed and the actual vehicle speed respectively. In the lower graph of FIG. 9, the solid line denotes the actual hydraulic pressure applied to the wheel cylinder and the broken line denotes the learning hydraulic pressure applied to the wheel cylinder.

As shown in FIG. 9, when the vehicle wheel is locked at moments t1, t3, and t5, the vehicle wheel speed drops abruptly relative to the estimated vehicle speed and the actual vehicle speed. The anti-skid control forces the vehicle wheel from the locked state to an unlocked state at moments t2, t4, and t6 following the moments t1, t3, and t5 respectively. When the vehicle wheel is unlocked, the vehicle wheel speed increases relative to the estimated vehicle speed and the actual vehicle speed.

In stable ranges where the vehicle wheel remains unlocked, the actual hydraulic brake pressure and the learning hydraulic brake pressure are generally equal. In unstable ranges where the vehicle wheel is locked, the actual hydraulic brake pressure is lower than the learning hydraulic brake pressure.

Figure 10:
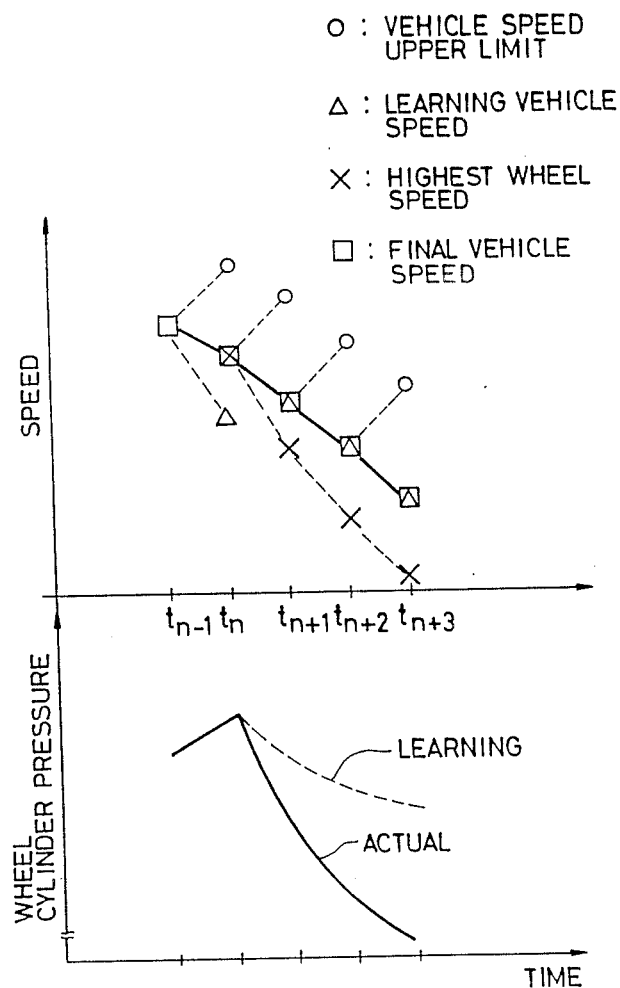
FIG. 10 is a diagram showing time dependent variations in vehicle speed upper limit, learing vehicle speed, vehicle wheel speed, deduced final vehicle speed, wheel cylinder hydraulic pressure, and learning hydraulic pressure.

As shown in the upper graph of FIG. 10, the vehicle speed upper limit VBU, the learning vehicle speed VBG, the highest vehicle wheel speed VWMAX, and the final vehicle speed VB are determined periodically at moments $t_{n-1}$, $t_n$, $t_{n+1}$, $t_{n+2}$, $t_{n+3}$ . . . which are separated by regular intervals corresponding to a period of reiteration of the anti-skid control program, for example, corresponding to a period of around 8 msec. In the lower graph of FIG. 10, the solid line denotes the actual hydraulic pressure applied to the wheel cylinder and the broken line denotes the learing hydraulic pressure applied to the wheel cylinder.

It is assumed that all the vehicle wheels are locked at the moment $t_{n+1}$ and then remain locked during an interval between the moments $t_{n+1}$ and $t_{n+3}$. At the moment $t_n$ when the vehicle wheels are unlocked, the highest vehicle wheel speed VWMAX corresponds to a value between the upper vehicle speed limit VBU and the learning vehicle speed VBG and is thus used as a final vehicle speed VB.

At the moment $t_{n+1}$ when all the vehicle wheels are locked, since all the vehicle wheel speeds drop abruptly, the highest vehicle wheel speed VWMAX also drops abruptly. Accordingly, at the moment $t_{n+1}$, the learning vehicle speed VBG corresponds to a value between the upper vehicle speed limit VBU and the highest vehicle wheel speed VWMAX and is thus used as a final vehicle speed VB.

Similarly, during an interval between the moments $t_{n+1}$ and $t_{n+3}$ in which the vehicle wheels ramain locked, the learning vehicle speed VBG corresponds to a value between the upper vehicle speed limit VBU and the highest vehicle wheel speed VWMAX and is thus used as a final vehicle speed VB.

In a stable range where the vehicle wheel remains unlocked, the actual hydraulic brake pressure and the learning hydraulic brake pressure are generally equal. In an unstable range where the vehicle wheel is locked, the actual hydraulic brake pressure is generally lower than the learning hydraulic brake pressure.

As described previously, in an unstable range where the vehicle wheels are locked, the learning vehicle speed VBG generally replaces the highest vehicle wheel speed VWMAX as an indication of the final vehicle speed VB. This replacement enables highly accurate estimation of actual vehicle speed and thus allows reliable anti-skid control.

It should be noted that modifications may be made in the embodiment of FIGS. 3-10. For example, in the block 190 of FIG. 7, the final vehicle speed VB may be equal to the higher of the learning vehicle speed VBG and the highest vehicle wheel speed VWMAX. This modification also enables highly accurate estimation of actual vehicle speed.

Figure 11:
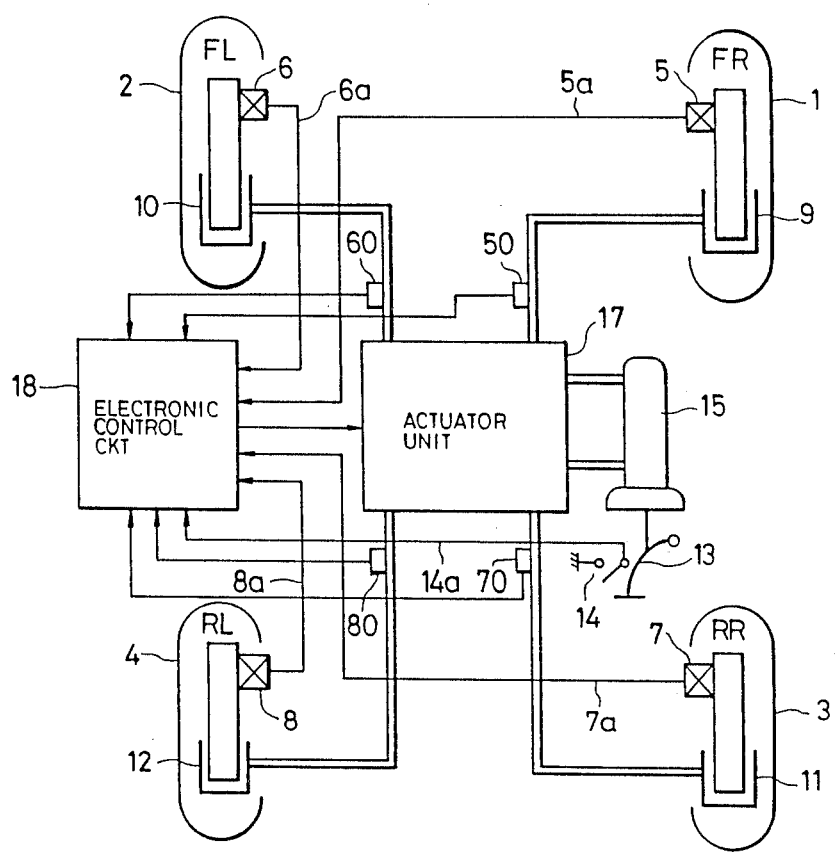
FIG. 11 is a diagram of an anti-skid control system according to a second specific embodiment of this invention.

FIG. 11 shows a second specific embodiment of this invention, which is similar to the embodiment of FIGS. 3-10 except for the following design changes.

As shown in FIG. 11, this embodiment includes hydraulic pressure sensors 50, 60, 70, and 80 disposed in the hydraulic lines connecting the actuator unit 17 and the wheel cylinders 9, 10, 11, and 12 respectively. These sensors 50-80 are electrically connected to the electronic control circuit 18. The sensors 50-80 generate signals representing hydraulic pressures applied to the wheel cylinders 9-12. These hydraulic pressure signals are applied to the electronic control circuit 18.

In the step 160 of the anti-skid control program (see FIG. 7), the target intervals d** are calculated by referring to the following equation.

$$d^{} = (P^{}n - 0.5 P^{}s) T / (0.5 P^{}s + K7)$$

where the character P**s represents the detected hydraulic pressures derived through the pressure sensors 50-80.

What is claimed is:

1. An anti-skid control system for a vehicle having a plurality of vehicle wheels, the system comprising:
   (a) means for detecting rotational speeds of the respective vehicle wheels;
   (b) a plurality of hydraulic actuators operative to brake respective vehicle wheels;

(c) means for calculating a sum of learning hydraulic pressures acting on the respective vehicle wheels, comprising calculating a revised hydraulic pressure derived from calculated differences between said detected vehicle wheel rotational speed and a target vehicle wheel rotational speed, and calculating a deceleration of the vehicle from the calculated sum;

(d) means for deriving a first speed of the vehicle from the detected vehicle wheel speeds;

(e) means for deriving a second speed of the vehicle from the calculated vehicle deceleration;

f) means for deriving a final speed of the vehicle as a function of the first vehicle speed and the second vehicle speed;

(g) means for controlling hydraulic brake pressures applied to respective hydraulic actuators in accordance with the detected vehicle wheel speeds and the final vehicle speed, and (h) means for deriving said target vehicle wheel rotational speed as a function of said final vehicle speed and a ratio of vehicle speed and vehicle wheel speed.

2. The system of claim 1 wherein the final vehicle speed deriving means is operative to select the higher of the first vehicle speed and the second vehicle speed as the final vehicle speed.

3. The system of claim 1 further comprising means for deriving an upper limit speed of the vehicle from a previously derived final vehicle speed, and wherein the final vehicle speed deriving means is operative to select one of the first vehicle speed, the second vehicle speed, and the upper limit vehicle speed which has a value residing between values of the other two speeds.

4. An anti-skid control system for a vehicle having a plurality of vehicle wheels, the system comprising:

(a) means for detecting rotational speeds of respective vehicle wheels;

(b) actuators for braking respective vehicle wheels, each actuator including a two-position valve for controlling the amount of hydraulic braking pressure applied to its associated vehicle wheel;

(c) means for calculating a target speed of the vehicle wheels on the basis of a final vehicle speed, the target wheel corresponding to a predetermined slip ratio;

(d) means for calculating parameters from differences between the target wheel speed and the respective detected wheel speeds, the parameters corresponding to variations in the respective wheel speeds;

(e) means for calculating learning hydraulic pressures for the respective vehicle wheels as a function of the parameters calculated from differences between the target wheel speed and the respective detected wheel speeds;

(f) means for calculating target hydraulic braking pressures applied to the respective vehicle wheels as a function of the learning hydraulic pressures and the parameters calculated from differences between the target wheel speed and the respective detected wheel speeds;

(g) means for controlling the respective two-position valves in accordance with the target hydraulic pressures;

(h) means for calculating a sum of the learning hydraulic pressures and calculating a deceleration of the vehicle from the calculated sum;

(i) means for determining a learning speed of the vehicle as a function of the calculated vehicle deceleration;

(j) means for determining a primary speed of the vehicle as a function of the detected wheel speeds; and (k) means for calculating the final vehicle speed from the learning vehicle speed and the primary vehicle speed.

* * * * *